United States Patent
Furukawa et al.

(10) Patent No.: US 12,476,464 B2
(45) Date of Patent: Nov. 18, 2025

(54) ELECTRIC POWER ADJUSTING DEVICE

(71) Applicant: Prime Planet Energy & Solutions, Inc., Tokyo (JP)

(72) Inventors: Kimihiko Furukawa, Kakogawa (JP); Noriharu Kobayashi, Kakogawa (JP); Masaki Yugou, Kakogawa (JP); Kohki Nakamura, Okazaki (JP); Shinya Inui, Kakogawa (JP); Keiichi Ito, Kasai (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 483 days.

(21) Appl. No.: 17/974,526

(22) Filed: Oct. 27, 2022

(65) Prior Publication Data

US 2023/0138275 A1    May 4, 2023

(30) Foreign Application Priority Data

Oct. 29, 2021    (JP) .................................. 2021-177700

(51) Int. Cl.
| | |
|---|---|
| H02J 3/32 | (2006.01) |
| B60L 53/62 | (2019.01) |
| B60L 53/65 | (2019.01) |
| B60L 53/67 | (2019.01) |
| H02J 3/38 | (2006.01) |

(52) U.S. Cl.
CPC .............. *H02J 3/322* (2020.01); *B60L 53/62* (2019.02); *B60L 53/65* (2019.02); *B60L 53/67* (2019.02); *H02J 3/381* (2013.01); *H02J 2300/30* (2020.01); *H02J 2300/40* (2020.01)

(58) Field of Classification Search
USPC ......................................................... 700/295
See application file for complete search history.

(56) References Cited

U.S. PATENT DOCUMENTS

| | | | |
|---|---|---|---|
| 2016/0126732 A1* | 5/2016 | Uyeki ............... | H02J 13/00001 |
| | | | 700/295 |
| 2017/0005515 A1* | 1/2017 | Sanders .................. | H02J 3/388 |
| 2020/0231056 A1* | 7/2020 | Sadano .................... | B60L 53/62 |
| 2021/0135484 A1* | 5/2021 | Waite ....................... | H02J 7/345 |
| 2021/0284039 A1 | 9/2021 | Ando et al. | |
| 2022/0242271 A1* | 8/2022 | Orihashi ................. | B60L 53/63 |
| 2023/0019914 A1* | 1/2023 | Ehara ....................... | H02J 3/003 |

FOREIGN PATENT DOCUMENTS

| | | |
|---|---|---|
| JP | 2020115704 A | 7/2020 |
| JP | 2021-150988 A | 9/2021 |
| JP | 2022-116975 A | 8/2022 |
| JP | 2023-013634 A | 1/2023 |
| WO | 2019/215817 A1 | 11/2019 |

\* cited by examiner

*Primary Examiner* — Mohammad Ali
*Assistant Examiner* — Joshua T Sanders
(74) *Attorney, Agent, or Firm* — HAUPTMAN HAM, LLP

(57) ABSTRACT

An electric power adjusting device is configured to execute a process of acquiring vehicle information of a plurality of electric vehicles connected to a power utility grid, a process of classifying, based on the vehicle information, the electric vehicles into a plurality of groups according to predetermined characteristics, and a process of adjusting a charging and discharging burden on the electric vehicles fir each of the groups when adjusting an electric power demand in the power utility grid.

17 Claims, 2 Drawing Sheets

ELECTRIC POWER ADJUSTING DEVICE

CROSS REFERENCE TO RELATED APPLICATIONS

The present application claims priority from Japanese Patent Application No. 2021-177700 filed on Oct. 29, 2021, which is incorporated by reference herein in its entirety.

BACKGROUND

The present invention relates to an electric power adjusting device.

JP 2020-115704 A discloses a power transmission/reception management device (management server) in a power transmission/reception system. The power transmission/reception management device (management server) disclosed in the publication includes a demand information acquiring unit, a selection unit, and a notification control unit. The demand information acquiring unit acquires information indicating the electric power demand in a power grid network. The selection unit selects, in response to the electric power demand, a vehicle equipped with a drive power source that has a stored energy amount greater than a predetermined stored amount and a storable energy amount greater than a predetermined storable amount as a vehicle that is allowed to transmit/receive electric power to/from the power grid network. The notification control unit notifies the user of the selected vehicle of the selection made by the selection unit.

The management server prompts a user of a vehicle in which the remaining capacity and the available capacity of the battery are higher than respective predetermined capacities to connect the vehicle to the power grid network. With the use of the vehicle equipped with a battery having a high remaining capacity and a high available capacity, it is possible to supply electric power to the power grid network when, for example, the supply of electric power from power generating facilities is short relative to the demand for electric power. It is also possible to absorb excessive electric power when the supply of electric power from the power generating facilities is in excess relative to the demand for electric power. Thus, with the use of a smaller number of vehicles, it is possible to deal with both cases where the demand for electric power is high and where the demand for electric power is low in the power grid network. Therefore, an electric power aggregator merely needs to manage a smaller number of vehicles to have a sufficient capacity for transmitting and receiving electric power between the vehicles and the power grid network.

SUMMARY

What is called Vehicle to Grid (V2G) refers to the technology of transmitting the electric energy stored in storage batteries in electric vehicles to a next generation power grid network called "smart grid". By connecting electric vehicles to the smart grid, the electric power stored in the electric vehicles may be used at other locations. V2G allows electric vehicles to be utilized not just as means of transportation but also as an infrastructure that helps balance the demand and supply of electric power. In the technology of allowing electric vehicles to participate in V2G, the present inventors intend to control the electric vehicles more appropriately and to further optimize the share of electric power demand on the electric vehicles.

An electric power adjusting device according the present disclosure may be configured to execute: a process of acquiring vehicle information of a plurality of electric vehicles connected to a power utility grid; a process of classifying, based on the vehicle information, the electric vehicles into a plurality of groups according to predetermined characteristics; and a process of adjusting a charging and discharging burden on the electric vehicles for each of the groups when adjusting an electric power demand in the power utility grid. The just-described configuration makes it possible to control electric vehicles more appropriately and to further optimize the share of electric power demand on the electric vehicles.

The electric power adjusting device may include a memory storage unit storing the vehicle information of the electric vehicles. The memory storage unit may also store each of the groups to which each of the electric vehicles belongs.

The vehicle information may include a charge-discharge capability of an on-board battery mounted in each of the electric vehicles. When this is the case, the process of classifying the electric vehicles may include classifying the electric vehicles into the plurality of groups based on the charge-discharge capability of the on-board battery. The vehicle information may include classification information of the electric vehicles. When this is the case, the process of classifying the electric vehicles may include classifying the electric vehicles into a group consisting of battery electric vehicles (BEVs) and a group excluding BEVs.

The group excluding BEVs may include an electric vehicle including an internal combustion engine and an on-board battery for driving the vehicle and being configured to charge electric power generated by the internal combustion engine into the on-board battery, and a fuel cell vehicle including a fuel cell. In this case, the electric power adjusting device may be configured so that discharging from the group excluding BEVs overrides discharging from the group consisting of BEVs when an electric power demand requirement in the power utility grid is a downward demand response (DR). It is also possible that the electric power adjusting device may be configured so that charging to the group excluding BEVs overrides charging to the group consisting of BEVs when an electric power demand requirement in the power utility grid is an upward DR. It is also possible that the electric power adjusting device may be configured so that charging to the group consisting of BEVs overrides charging to the group excluding BEVs when an electric power demand requirement in the power utility grid is an upward DR.

The vehicle information may also include a maximum charge capacity of an on-board battery mounted in each of the electric vehicles. When this is the case, the process of classifying the electric vehicles may include classifying the electric vehicles into the plurality of groups based on the maximum charge capacity of the on-board battery.

The electric power adjusting device may also be configured to be able to set a required amount of charge for each of the electric vehicles. The vehicle information may also include a maximum charge capacity of an on-board battery mounted in each of the electric vehicles, and the process of classifying the electric vehicles may also include classifying the plurality of electric vehicles connected to the power utility grid into the plurality of groups based on a spare capacity obtained by subtracting the required amount of charge from the maximum charge capacity of the on-board battery.

The vehicle information may also include a deterioration level of an on-board battery mounted in each of the electric vehicles. The process of classifying the electric vehicles may include classifying the plurality of electric vehicles connected to the power utility grid into the plurality of groups based on the deterioration level of the on-board battery. In addition, the vehicle information may also include temperature information of an on-board battery mounted in each of the electric vehicles. The process of classifying the electric vehicles may include classifying the plurality of electric vehicles connected to the power utility grid into the plurality of groups based on the temperature of the on-board battery.

The electric power adjusting device may further be configured to be able to set each of the electric vehicles to actively participate in adjusting the electric power demand in the power utility grid. When this is the case, the process of classifying the electric vehicles may include classifying the plurality of electric vehicles connected to the power utility grid into the plurality of groups according to Whether or not the electric vehicle is set to actively participate in adjusting the electric power demand in the power utility grid.

In addition, in the process of adjusting, each of burdens of the electric power demand shared by each of the groups may be different between when the electric power demand requirement in the power utility grid is an upward DR and when a downward DR.

DETAILED DESCRIPTION

Embodiments of the present disclosure will be described hereinbelow it should be noted, however, that the embodiments illustrated herein are, of course, not intended to limit the disclosure. The drawings are depicted schematically and do not necessarily accurately depict actual objects. The features and components that exhibit the same effects are designated by the same reference symbols as appropriate, and the description thereof will not be repeated.

Figure 1:
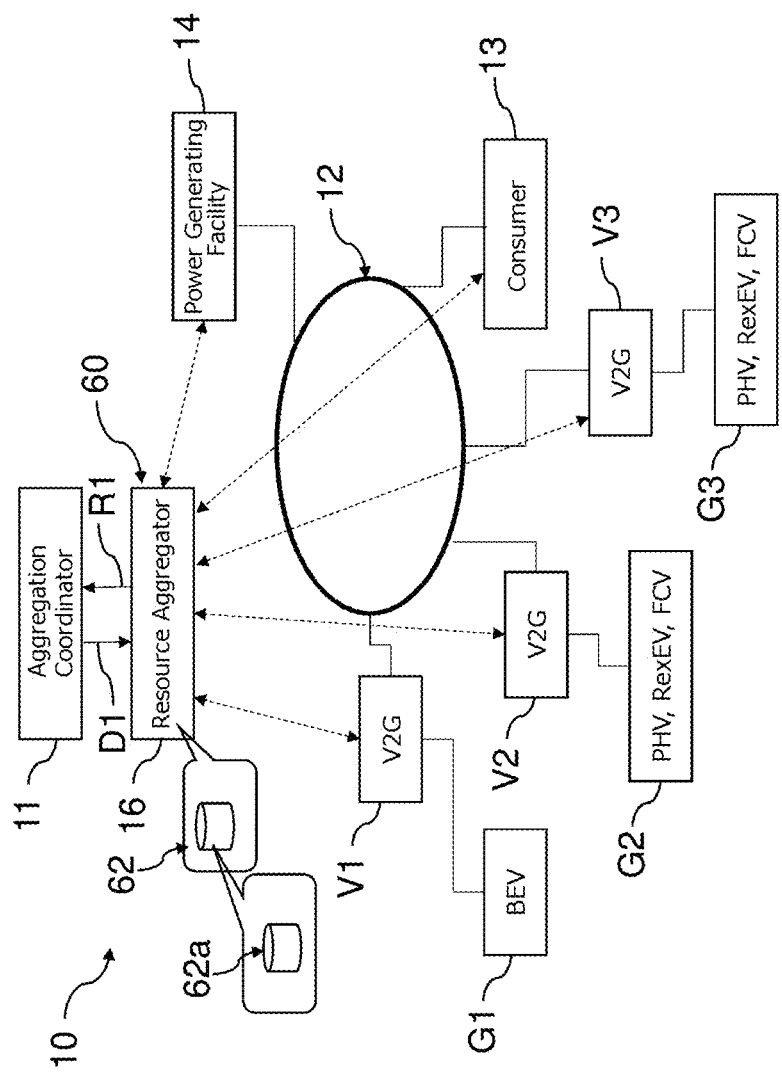
FIG. 1 is a schematic view illustrating the outline of a V2G system 10.

FIG. 1 is a schematic view illustrating the outline of a V2G system 10. The V2G system 10 includes, as illustrated in FIG. 1, an aggregation coordinator 11, a power utility grid 12 (also simply called "grid"), consumers 13, power generating facilities 14, a resource aggregator 16, and V2G devices V1 to V3. Electric vehicles connected to the V2G devices V1 to V3 are classified respectively into groups G1 to G3, and they are controlled by the resource aggregator 16 through the V2G devices V1 to V3.

The aggregation coordinator 11 is a business operator that aggregates the amount of electric power controlled by the resource aggregator 16 and engages in electric power transactions with general transmission-and-distribution operators and retail electric providers. The aggregation coordinator 11 is served by, for example, a power utility company.

The power utility grid 12 is a system that integrates power generation, electrical substations, power transmission, and power distribution together, for supplying electric power to consumers' power receiving facilities. The power utility grid may include, for example, a transmission grid from power generation plants, and a distribution grid that supplies electric power from the transmission grid to end consumers. The power utility grid 12 in which the resource aggregator 16 is involved is a smart grid (next generation electrical grid). The smart grid is an electrical grid that is able to control and optimize the flow of electric power from both the supply side and the demand side. The smart grid incorporates dedicated devices and dedicated software in part of the electrical grid. Accordingly, the smart grid is configured to distribute base locations of power transmission so that electric power can be interchanged between both consumers and suppliers.

The consumers 13 refer to those who receive the supply of electricity and use the electricity. The power generating facilities 14 include various types of power generating facilities, such as regional solar power generation, wind power generation, small-sized hydroelectric power generation, and fuel cells. The technique in which demand patterns of electric power are changed by owners of the consumer-side energy resources or third parties by controlling their energy resources is called demand response (DR). Depending on the patterns of demand control, the demand response for consumers 13 is classified into two types, "downward DR" in which demand is reduced (i.e., suppressed) and "upward DR" in which demand is increased (i.e., created).

The resource aggregator 16 is generally a business operator that directly makes VPP service agreements with consumers of electric power to control the resources. Herein, the term "virtual power plant (VPP)" generally means that consumers, owners of power generating facilities and electricity storage facilities that are directly connected to the power utility grid, and third parties perform controlling of their energy resources to provide the function equivalent to a power generation plant.

In this embodiment, the resource aggregator 16 utilizes electric vehicles as an energy resource to contribute to demand response (DR). To use electric vehicles as an energy resource, the resource aggregator 16 stores electric power in the electric vehicles when there is a surplus of electric power in the power utility grid, while it transmits the electric power stored in the electric vehicles to the power utility grid when there is a shortfall of electric power in the power utility grid. This makes it possible to adjust the electric power demand in the microgrid (electrical grid) to which the electric vehicles are connected.

The V2G devices V1 to V3 are devices for connecting electric vehicles to the power utility grid 12. It should be noted that although FIG. 1 shows only three V2G devices V1 to V3, this is, of course, merely illustrative. A plurality of V2G devices V1 to V3 are connected to the power utility grid 12 in which the resource aggregator 16 is involved, and through the plurality of V2G devices V1 to V3, a plurality of electric vehicles are connected to the power utility grid 12, in this embodiment, a plurality of electric vehicles are classified into a group G1 consisting of BEVs and groups G2 and G3 excluding BEVs, and each of which is connected to the power utility grid 12 through the V2G devices V1 to V3. The V2G devices V1 to V3 connect the respective electric vehicles to the power utility grid 12, Although FIG. 1 depicts that a respective one of the V2G devices V1 to V3 is provided for each of the groups G1 to G3 to which a plurality of electric vehicles belong, this does not accurately reflect the actual configuration. The V2G devices V1 to V3 may be provided so that, for example, each one of electric vehicles is connected to each one of V2G devices. For the groups G1 to G3 to which a plurality of electric vehicles belong, a plurality of V2G devices are provided according to the number of the electric vehicles. Note that the grouping of the electric vehicles is related to the control performed by the resource aggregator 16. The grouping of electric vehicles may be carried out by, for example, the resource aggregator 16 through the V2G devices V1 to V3.

The resource aggregator 16 is provided with a server 60 that manages the V2G system 10. The server 60 is communicatively connected to the aggregation coordinator 11, the V2G devices V1 to V3, the consumers 13, and the power generating facilities 14 through a communication network. The communication network NW may be either a wired network or a wireless network, or may be a communication network such as the Internet or a communication network that uses power line communication utilizing the power grid. The server 60 is provided in, for example, a facility managed by the resource aggregator 16. The server 60 may be configured to serve the function within the country through the communication network NW, but the server 60 itself may be located outside the country. The server 60 may be implemented by either a single computer or a cooperative process of a plurality of computers. Various processes of the server 60 may be implemented by a cooperative process of the server 60 with a computer of the aggregation coordinator 11, computers of the consumers 13, computers of the power generating facilities 14, the V2G devices V1 to V3, and computers of the electric vehicles, not just by the server 60 alone. The V2G devices V1 to V3 and the computers of the electric vehicles and the like may incorporate required software corresponding to the resource aggregator 16.

As illustrated in FIG. 1, the aggregation coordinator 11 requests the resource aggregator 16 to perform control for adjusting electric power demand (D1). The resource aggregator 16 responds to such a control request according to the agreement with the aggregation coordinator 11 (R1). The adjustments that are required of the resource aggregator 16 are two types, "downward DR" in which electric power demand is reduced (i.e., suppressed) and "upward DR" in which electric power demand is increased (i.e., created).

Herein, electric vehicles that are connected to the power utility grid 12 through the V2G devices V1 to V3 include various types of electric vehicles, such as plug-in hybrid electric vehicles (PHEVs), plug-in range extender electric vehicles (RexEVs), fuel cell electric vehicles (FCEVs), and battery electric vehicles (BEVs). These electric vehicles have different performance requirements for their on-board batteries. In addition, the electric vehicles may also include other types of vehicles such as buses and trucks. Although those hybrid electric vehicles that come in the plug-in function also have an on-board battery, they are unable to connect to the V2G system. These electric vehicles tend to be equipped with respective batteries having characteristic features that are appropriate for respective electric vehicles.

For example, an on-board battery to be mounted in hybrid electric vehicles that do not come in the plug-in function has required characteristics such that, when the on-board battery is a lithium-ion secondary, lithium deposition does not occur even in charging and discharging at high rate or that the battery has a low internal resistance. These characteristics are achieved by, for example, various design considerations on active material, density of the active material layer, electrolyte solution, and so forth. As for the on-board batteries, a battery that has a characteristic feature capable of charging and discharging at high rate is called a high output type battery. Whether an on-board battery is of high power type or not may be evaluated according to the electric current permitted by the on-board battery. Such a type of the on-board battery may permit an electric current of, for example, about 120 A to about 250 A per one cell.

Typical examples of the materials used for the lithium-ion secondary batteries for use as electric power sources for driving the hybrid electric vehicles that do not come in the plug-in function include what is called an NMC three-component lithium-containing transition metal composite oxide, which contains nickel manganese cobalt, for the positive electrode active material, graphite for the negative electrode active material, and ethylene carbonate or ethyl methyl carbonate for the electrolyte solution. For example, a large-sized prismatic battery that is incorporated in hybrid electric vehicles may achieve a charge-discharge current of about 120 A at 30 It while preventing the deterioration of the secondary battery. As the research advances further in the future, it is expected that electric power sources for driving hybrid electric vehicles will evolve further to achieve charging at further higher currents. Here, the rate It is defined as It (A)=rated capacity (Ah)/1 (h).

In contrast, battery electric vehicles are not equipped with an electric generator. The higher the charge capacity of the on-board battery is, the longer the traveling distance range the electric vehicle can travel per one time of charging. For this reason, the on-board battery tends to be required to achieve higher capacity rather than the performance of recovering regenerative energy. The lithium-ion secondary batteries that are used as electric power sources for driving battery electric vehicles are intended to achieve further higher capacity by increasing the densities of the positive electrode active material and the negative electrode active material or by redesigning their structures.

High capacity-type batteries, which specifically feature high capacity, easily deteriorate by charging and discharging at high rates, so they tend to be restricted not to be charged at a high current rate. For this reason, they are in many cases restricted not to be charged even in the cases where regenerative energy is obtained. For example, for a large-sized prismatic battery that is incorporated in battery electric vehicles, the upper limit value of the charge-discharge current is limited to about 150 A at 3 It in order to prevent the deterioration of the secondary battery. As the research advances further in the future, it is expected that electric power sources for driving battery electric vehicles will evolve further to achieve charging at further higher currents; however, the upper limit of the current rate per capacity of the batteries for battery electric vehicles tends to be lower than that of the batteries for hybrid electric vehicles that do not come in the plug-in function.

Plug-in hybrid electric vehicles and plug-in range extender electric vehicles are equipped with an internal combustion engine and an electric generator. Fuel cell vehicles are equipped with a fuel cell. Fuel cell vehicles may additionally be provided with the function to connect to an external power supply (i.e., plug-in function), so that, by additionally providing the function to connect to an external power supply, they can be allowed to participate in the V2G system. This enables the electric vehicles to generate electric power to charge the on-board battery even during travel. On the other hand, in order to improve the fuel economy, it is desirable to actively use the regenerative energy for charging. Accordingly, the on-board battery for use in hybrid electric vehicles that come in the plug-in function, range extender type EVs, and fuel cell vehicles tends to be required to achieve both high capacity and capability of being charged at high rate in a well-balanced manner. Hereinafter, hybrid electric vehicles that come in the plug-in function, range extender type EVs, and fuel cell vehicles may be collectively referred to as plug-in hybrid electric vehicles and the like. The characteristics of the on-board batteries may vary among different types of plug-in hybrid electric vehicles and the like. The characteristics of on-board batteries may vary depending on the model and the model year of vehicle.

The resource aggregator 16 sends a control signal to the V2G devices V1 to V3 in response to an electric power demand requirement, to control charging and discharging of the electric vehicles connected to the V2G devices V1 to V3. The electric power demand requirement from the aggregation coordinator 11 changes from moment to moment as time passes. In addition, the number of electric vehicles connected to the power utility grid 12 through the V2G devices V1 to V3, for example, also changes. There may be cases where the electric power demand requirement from the aggregation coordinator 11 increases suddenly.

When adjusting the electric power demand Dx from the aggregation coordinator 11, it may be necessary to discharge a large amount of electric power from electric vehicles or to charge a large amount of electric power to electric vehicles in such cases where the number of the electric vehicles participating in the V2G system is small, for example. In such cases, it is not necessarily appropriate to control the V2G system so as to charge and discharge a plurality of electric vehicles connected to the power utility grid 12 through the V2G devices V1 to V3 under the same condition, from the viewpoint of minimizing the deterioration of the on-board batteries incorporated in the electric vehicles. Moreover, varying the input to and output from the on-board battery finely according to small fluctuations in electric power demand Dx may be a cause of deterioration of the on-board battery, depending on the current value. Furthermore, because the performance of the on-board battery deteriorates due to use, the level of deterioration varies from one electric vehicle to another. In addition, the amounts of charge required for an electric vehicle vary between users, and the needs of the users for participating the V2G system are also different from one user to another. The present inventors have made the above-described discoveries. The present inventors proposes an electric power adjusting device 62 that enables a plurality of electric vehicles participating in a V2G system to share electricity demand more appropriately.

The electric power adjusting device 62 may be embodied by a computer. Various processes and functions of the electric power adjusting device 62 may be processed by an arithmetic unit [also referred to as a processor, CPU (central processing unit), or MPU (micro-processing unit)] and a memory storage device (such as a memory and a hard disk) of the computer that constitutes the electric power adjusting device 62. For example, various configurations of the electric power adjusting device 62 may each be embodied as a database that stores various data embodied by a computer in a predetermined format, a data structure, or a processing module that performs predetermined computing processes according to a predetermined program, or may each be embodied as part of the database, the data structure, or the processing module. Various processes and functions of the electric power adjusting device 62 may each be embodied by a cooperative process of a plurality of computers. The electric power adjusting device 62 may be implemented as a part of the functions of the server 60 managed by the resource aggregator 16, as illustrated in FIG. 1.

The electric power adjusting device 62 is configured to execute the following processes A to C.

The process A is a process of acquiring vehicle information of a plurality of electric vehicles connected to the power utility grid 12.

The process B is a process of classifying the electric vehicles into a plurality of groups G1 to G3 according to predetermined characteristic features based on the vehicle information.

The process C is a process of adjusting a charging and discharging burden on the electric vehicles for each of the groups G1 to G3 when adjusting an electric power demand in the power utility grid 12.

This electric power adjusting device 62 classifies a plurality of electric vehicles into groups G1 to G3 according to their characteristics. The charging and discharging burden in participating in the V2G system is adjusted for each of the groups G1 to G3. This allows each of the groups G1 to G3 to share the electric power demand more appropriately in the case where a plurality of electric vehicles participate in the V2G system. Thus, the performance and characteristics of on-board batteries, user needs, etc., are matched within each of the groups G1 to G3 so that, for example, the on-board batteries can be prevented from performance degradation and the electric vehicles can be allowed to participate in the V2G system according to the user needs. As a result, for example, the on-board batteries may be controlled more appropriately, and the share of electric power demand may be optimized more appropriately. Hereinbelow, specific examples of each of the processes will be described.

The process A involves acquiring vehicle information of a plurality of electric vehicles connected to the power utility grid 12. The vehicle information to be acquired may contain, for example, information that contributes to grouping of electric vehicles in the process B. Herein, in the process C, the charging and discharging burden on the electric vehicles is adjusted for each of the groups when adjusting an electric power demand in the power utility grid 12. Therefore, the vehicle information may contain information that is useful for adjusting the charging and discharging burden on the electric vehicles. It is also possible that the process A may distinguish whether a vehicle is a batten electric vehicle or a hybrid electric vehicle provided with a plug-in feature by acquiring, as the vehicle information, information that identifies the vehicle, such as the type of the vehicle or the vehicle identification number. Battery electric vehicles are unable to generate electric power by themselves so they need to be provided with a predetermined amount of charge. For this reason, there is a restriction on the battery electric vehicles that a sufficient charge amount needs to be provided when participating in the V2G system. Plug-in hybrid electric vehicles are capable of generating electric power by themselves. Taking fuel economy into consideration, it is desirable that plug-in hybrid electric vehicles are also charged to a sufficient level when participating in the V2G system. However, in comparison with battery electric vehicles, the absolute restriction on plug-in hybrid electric vehicles are less when participating in the V2G system.

Battery information may be acquired by, for example, acquiring the information stored in electric vehicles from their controllers such as ECUs of the electric vehicles through the V2G devices V1 to V3.

When this is the case, the vehicle information to be acquired may be vehicle type information (i.e., information that can identify the vehicle, such as the type of the vehicle or the vehicle identification number). This enables the resource aggregator 16 to search or acquire the battery information from the information (database) managed by the resource aggregator 16, based on the vehicle type information. The vehicle information to be acquired may be battery information (such as the manufacturer, the model number, the type of the battery, or the state of deterioration). This enables the resource aggregator 16 to search or acquire the battery information from the information managed by the resource aggregator 16. The vehicle information to be acquired may be an identifier (ID) that is assigned to each of the vehicles. In this case, the ID may be a contract number that is assigned to the vehicle by the resource aggregator 16. This enables the resource aggregator 16 to search or acquire the battery information of the on-board battery based on the contract number when the electric vehicle is connected to the V2G system through the V2G devices V1 to V3.

The electric power adjusting device 62 may include a memory storage unit 62a that stores vehicle information of electric vehicles. In this case, the electric power adjusting device 62 may also be configured to allow the memory storage unit 62a to store the information of the electric vehicle whose vehicle information has been acquired. It is also possible that the memory storage unit 62a may also pre-store vehicle information of a plurality of electric vehicles. When the memory storage unit 62a stores vehicle information of the plurality of electric vehicles, the process A may involve acquiring the vehicle information of the plurality of electric vehicles from the memory storage unit 62a. The vehicle information of the electric vehicles that are not stored in the memory storage unit 62a may be acquired by communication with the electric vehicles. The memory storage unit 62a may contain information that identifies groups G1 to G3 to which the plurality of electric vehicles are to be classified in the process B. When the memory storage unit 62a contains the information that identifies groups G1 to G3 to which the electric vehicles are to be classified, the process B is performed more easily. For example, once an electric vehicle is classified into a group, the one of the groups G1 to G3 into which the electric vehicle is classified may be stored in the memory storage unit 62a.

The process B involves classifying the electric vehicles into a plurality of groups G1 to G3 according to predetermined characteristic features of the electric vehicles, based on the vehicle information. For example, the vehicle information acquired in the process A may include a charge-discharge capability of the on-board battery mounted in each of the electric vehicles. Then, the process B may classify the electric vehicles into the plurality of groups G1 to G3 based on the charge-discharge capability of the on-board battery. In this case, the process C adjusts the charging and discharging burden on the electric vehicles for each of the groups G1 to G3 when adjusting the electric power demand in the power utility grid 12. Because the electric vehicles are classified into the plurality of groups G1 to G3 based on the charge-discharge capability of the on-board battery, the on-board batteries are prevented from deterioration.

Thus, the vehicle information contains classification information of the electric vehicles. The process of classifying the electric vehicles may include a process of classifying the electric vehicles into a group G1 consisting of BEVs and groups G2 and G3 excluding BEVs based on the classification information. In this case, the groups G1 to G3 are classified according to whether or not the electric vehicles are battery electric vehicles. The process C involves performing appropriate control operations for the respective groups G1 to G3. In this case, the resource aggregator 16 may, for example, allow the group G1 consisting of battery electric vehicles to serve the role of stably performing charging and discharging at a constant current value in response to the demand response. The resource aggregator 16 may allow the vehicles that are not battery electric vehicles to serve the role of contributing to a short-term demand response adjustment. The groups G2 and G3 excluding BEVs include electric vehicles that are equipped with an on-board battery for driving the vehicle and an internal combustion engine and are configured to charge the electricity generated by the internal combustion engine into the on-board battery, and fuel cell vehicles that are mounted with a fuel cell. The groups excluding BEVs contain, for example, plug-in hybrid electric vehicles, which are differentiated from battery electric vehicles.

Figure 2:
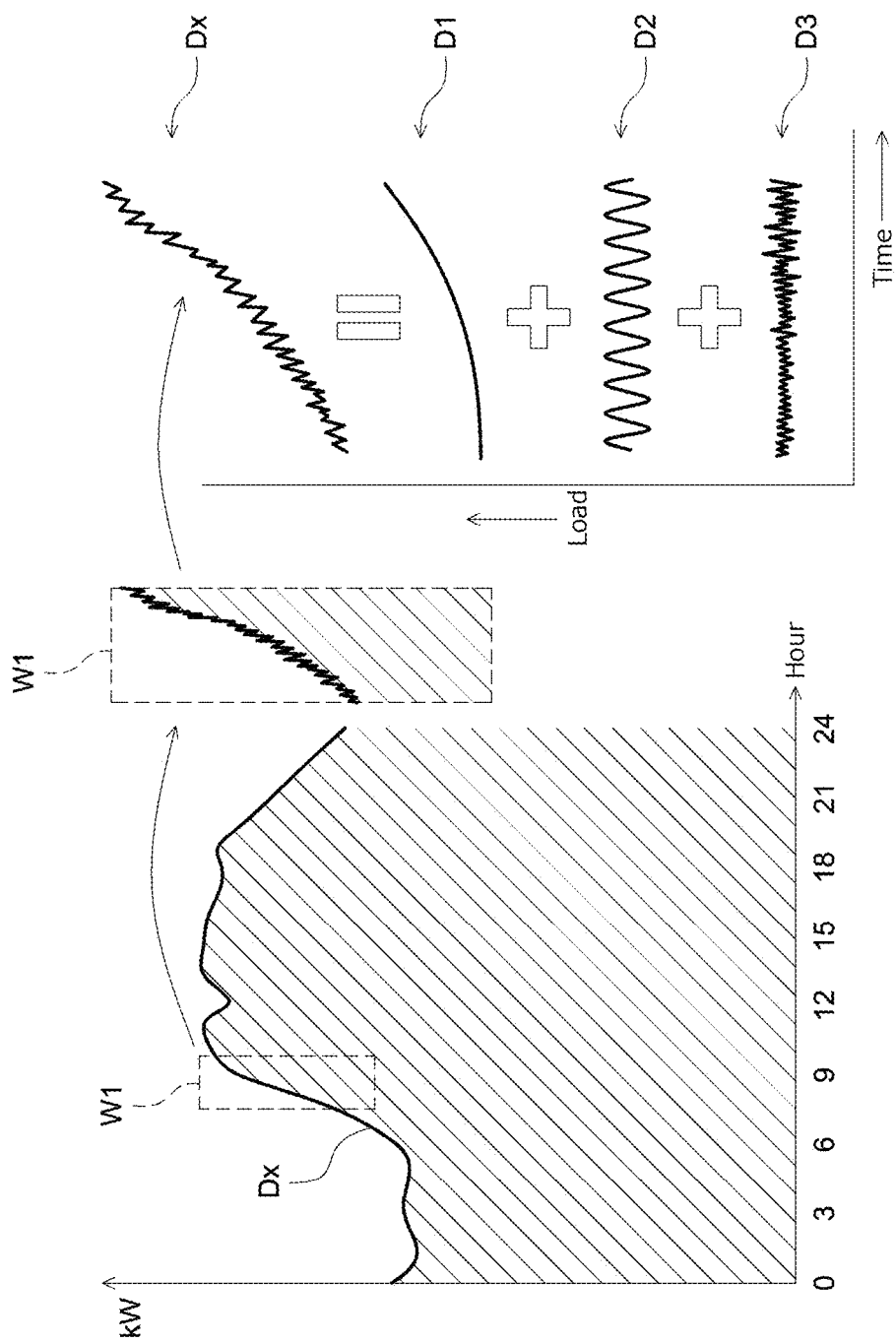
FIG. 2 is a schematic graph illustrating a change in electric power demand Dx from an aggregation coordinator 11.

For example, FIG. 2 is a schematic graph illustrating a change in electric power demand Dx from the aggregation coordinator 11. The electric power demand Dx from the aggregation coordinator 11 changes from moment to moment as time passes, as shown in FIG. 2. In the example showy in FIG. 2, for example, the electric power demand Dx is lower from late at night to early morning or example, from 0 a.m. to 6 a.m.) in a day. The electric power demand Dx increases from around dawn (for example, from about 6 a.m.), and the electric power demand Dx peaks toward the dinnertime. Then, the electric power demand Dx gradually decreases from bedtime. In addition, as shown by an enlarged portion W1 of the graph, the electric power demand Dx fluctuates little by little when viewed in detail. Moreover, the changes in electric power demand Dx (real load fluctuation) may be understood by dividing it into smaller components, period by period. For example, as illustrated in FIG. 2, the electric power demand Dx can be understood by dividing it into three components, a long period component D1, a short period component D2, and an ultra-short period component D3. For example, it is possible that the long period component D1 may be considered to be a waveform capturing the changes in electric power demand at a 30-minute period, the short period component D2 to be a waveform capturing the changes in electric power demand at 5-minute intervals, and the ultra-short period component D3 to be a waveform capturing the changes in electric power demand at 10-second intervals. Herein, the periods at which the fluctuations of electric power demand Dx are captured may be set as appropriate.

In this case, the resource aggregator 16 may control the V2G system so that a group containing electric vehicles equipped with a relatively high capacity on-board battery, such as the group G1 consisting of BEVs, is assigned to take care of the long period component D1. For the group assigned to take care of the long period component D1, the input to and output from the electric vehicles may desirably be changed gradually. This serves to prevent battery deterioration even for the on-board batteries of BEVs that have high-capacity type characteristics. The V2G system may be controlled so that a group containing electric vehicles equipped with an on-board battery showing higher performance of recovering regenerative energy, such the groups G2 and G3 excluding BEVs, is assigned to take care of the short period component D2 or the ultra-short period component D3. In the embodiment shown in FIG. 1, the group excluding BEVs is further subclassified into smaller groups, a group G2 that is assigned to take care of the short period component D2 and a group G3 that is assigned to take care of the ultra-short period component D3, according to their performance of recovering regenerative energy, in other words, high-output power type characteristics. Thus, each of the group G1 consisting of BEVs and the groups G2 and G3 excluding BEVs may be further subclassified into smaller groups according to various types of characteristics. The electric power adjusting device 62 may adjust the share of electric power demand Dx for each of the groups according to their characteristics. This allows the electric vehicles to participate in the V2G system appropriately according to their characteristics and needs.

For example, the electric power adjusting device 62 may be configured so that discharging from the groups G2 and G3 excluding BEVs overrides discharging from the group G1 consisting of BEVs when the electric power demand requirement in the power utility grid 12 is "downward DR". The downward DR requires an adjustment for reducing electric power demand. In this case, in the V2G system, the resource aggregator 13 can reduce charging to electric vehicles and also cause electric vehicles to discharge electric power, to respond to the demand response requirement. At this time, for example, the electric vehicles belonging to the groups G2 and G3 excluding BEVs are able to generate electric power by themselves, so the groups G2 and G3 excluding BEVs can be allowed to set a lower required amount of charge than the group G1 consisting of BEVs. Accordingly, the electric power adjusting device 62 may be controlled so that the groups G2 and G3 excluding BEVs are allowed to discharge preferentially in response to the downward DR.

Also, the electric power adjusting device 62 may be configured so that charging to the groups G2 and G3 excluding BEVs overrides charging to the group G1 consisting of BEVs when the electric power demand requirement in the power utility grid 12 is "upward DR". The upward DR requires an adjustment for creating electric power demand. In this case, in the V2G system, the resource aggregator 16 can allow the electric vehicles to be charged to create a demand, to thereby respond to the demand response requirement. At this time, the electric power adjusting device 62 may be configured so that charging to the groups G2 and G3 excluding BEVs overrides charging to the group G1 consisting of BEVs. This increases the frequency of use of the groups G2 and G3 excluding BEVs for the demand response. This serves to, for example, reduce the participation of the group G1 consisting of BEVs in the demand response, and prevent deterioration of the on-board batteries in the group G1 consisting of BEVs.

In this case as well, the group G1 consisting of BEVs may be used to be stably charged and discharged at a constant current value in response to demand response. The groups G2 and G3 excluding BEVs may deal with the situation in which an electric power demand adjustment occurs that cannot be dealt with the charging and discharging of the group G1 consisting of BEVs. In this case, the group G1 consisting of BEVs may take care of charging and discharging that forms the base in response to the demand response and the groups G2 and G3 excluding BEVs may take care of an increase/decrease portion of the short-term electric power demand. This serves to stabilize the current values in charging and discharging of the group G1 consisting of BEVs. As a result, it is possible to prevent the battery deterioration resulting from fluctuations in the current values of charging and discharging of the group G1 consisting of BEVs. The groups G2 and G3 excluding BEVs show fluctuations in the charge and discharge current values. However, the electric vehicles belonging to the groups G2 and G3 excluding BEV's are highly likely to be equipped with a so-called high-output power type battery. This means that the groups G2 and G3 excluding BEVs are more resistant to the battery deterioration resulting from variations in the charge and discharge current value than the group G1 consisting of BEVs, Thus, the electric power adjusting device 62 may be configured to deal with the short-term increases or decreases of electric power demand in the power utility grid 12 by charging and discharging the electric vehicles belonging to the groups G2 and G3 excluding BEVs.

On the other hand, the electric power adjusting device 62 may be configured so that charging to the group G1 consisting of BEVs overrides charging to the groups G2 and G3 excluding BEVs when the electric power demand requirement in the power utility grid 12 is upward DR. The electric vehicles belonging to the groups G2 and G3 excluding BEVs are able to generate electric power by themselves, so the groups G2 and G3 excluding BEVs can be allowed to set a lower required amount of charge than the group G1 consisting of BEVs. In addition, the electric vehicles belonging to the groups G2 and G3 excluding BEVs are more resistant to battery deterioration even when they are subjected to repeated charging and discharging at high rates. In contrast, the electric vehicles belonging to the group G1 consisting of BEVs are unable to generate electric power by themselves, so the required amount of charge is set higher. For this reason, the group G1 consisting of BEVs may be charged preferentially when the electric power demand requirement is upward DR. As a result, the required amount of charge is easily provided sufficiently for the group G1 consisting of BEVs.

The vehicle information may include a maximum charge capacity of an on-board battery mounted in each of the electric vehicles. The process of classifying the electric vehicles may include a process of classifying the electric vehicles into a plurality of groups based on the maximum charge capacity of the on-board battery. For example, among battery electric vehicles, there are small battery electric vehicles for use in short-distance travel applications so that they have a low-capacity on-board battery. This type of battery electric vehicle may be differentiated from large-sized ones with a higher capacity on-board battery and classified into a different group. The large-sized electric vehicles with a higher capacity on-board battery are suitable for, for example, stably charging and discharging at a constant current value in response to the demand response requirement. In contrast, the small-sized vehicles with a lower capacity on-board battery are suitable to be used, for example, for contributing to a short-term demand response adjustment. It is also possible that the electric vehicles may be classified according to the size of electric vehicle, such as the weight of the vehicle, or the EV travel range at the fully charged state, in place of classifying according to the maximum charge capacity of the on-board battery.

The electric power adjusting device 62 may also be configured to be able to set a required amount of charge for each of the electric vehicles, for example. The required amount of charge refers to an amount of charge required by an electric vehicle. The required amount of charge may be preset in the electric power adjusting device 62 or the electric vehicle. The required amount of charge may be set as desired by, for example, the user of the electric vehicle. In this case, the electric power adjusting device 62 is able to acquire the size of capacity obtained by subtracting the required amount of charge from the maximum charge capacity of the on-board battery. Herein, the capacity obtained by subtracting the required amount of charge from the maximum charge capacity of the on-board battery is referred to as "spare capacity". In the process of classifying the electric vehicles, it is also possible to classify a plurality of electric vehicles connected to the power utility grid 12 into a plurality of groups based on the spare capacity of each of the electric vehicles.

In this case, assuming that the required amount of charge is 50% SOC of the on-board battery, for example, the spare capacity is the amount of charge obtained by subtracting the capacity at 50% SOC of the on-board battery from the maximum charge capacity, at 100% SOC, of the on-board battery. The maximum charge capacity of the on-board battery may vary when the deterioration of the on-board battery is taken into consideration. For example, when the SOH is 90%, the maximum charge capacity of the on-board battery is 90% of the initial full charge capacity. In this case, assuming that the required amount of charge is 50% of the initial full charge capacity of the on-board battery, for example, the spare capacity is obtained as 40% of the initial full charge capacity. In this way, by classifying a plurality of electric vehicles connected to the power utility grid 12 into a plurality of groups according to the spare capacity, the resource aggregator 16 is able to classify the electric vehicles into groups according to the size of the capacity of the on-board battery when it is used as an energy resource. The resource aggregator 16 may, for example, control a vehicle with a higher spare capacity to be allowed to stably participate in the V2G system, and also control a vehicle with a lower spare capacity to mainly be assigned to take care of absorbing the variations in the demand response.

The vehicle information may also include a deterioration level of an on-board battery mounted in each of the electric vehicles. The deterioration level of the on-board battery may be evaluated by an electronic control unit (ECU) or the like of the electric vehicle. The deterioration level of the on-board battery is an indicator for representing the health or the deterioration state of the battery, which may also be referred to as state-of-health (SOH). The deterioration level of the on-board battery may be represented as the proportion of the fully charged capacity (Ah) when the initial full charge capacity (Ah) is set to 100%. Accordingly, the case where the on-board batter results in 50% SOH, it means that the battery has only half of the initial capacity even when the battery is fully charged. In the process of classifying the electric vehicles, it is also possible to classify a plurality of electric vehicles connected to the power utility grid 12 into a plurality of groups based on the deterioration level of the on-board battery.

The vehicle information may also include temperature information of an on-board battery mounted in each of the electric vehicles. In this case, the temperature information of the on-board battery may be detected by an ECU or the like of the electric vehicle, and the electric power adjusting device 62 may acquire the temperature information of the on-board battery through the V2G devices V1 to V3 from each of the electric vehicles connected to the V2G devices V1 to V3. In the process of classifying the electric vehicles, it is possible to classify a plurality of electric vehicles connected to the power utility grid 12 into a plurality of groups based on the temperature of the on-board battery. In this case, the temperature of the on-board battery mounted in the electric vehicle may change from moment to moment according to the ambient temperature, such as when the electric vehicle is placed in a location where the electric vehicle is exposed to direct sunlight. For this reason, the electric power adjusting device 62 may be configured to update the temperature information of the on-board battery at predetermined timing through the V2G devices V1 to V3, to appropriately change the group to which the electric vehicles belong. In this case, a group of electric vehicles showing higher temperatures and a group of on-hoard batteries that have been extremely cooled by being placed outside in a cold region may be refrained from charge and discharge, or may be adjusted to an appropriate SOC for the temperature.

In addition, the group of on-board batteries that have been extremely cooled may be further classified into groups according to whether or not a heater is provided for heating the on-board battery. In this case, for the group provided with a heater for heating the on-board battery, it is possible to actuate the heater through the V2G devices V1 to V3 so that the on-board battery can be heated. In addition, the group of electric vehicles showing higher temperatures may be further classified into groups according to whether or not a cooling device is provided for cooling the on-board battery. In this case, for the group provided with a cooling device for cooling the on-board battery, it is possible to actuate the cooling device through the V2G devices V1 to V3 so that the on-board battery can be cooled. Accordingly, the electric vehicles are allowed to participate in the V2G system while adjusting the on-board battery to an appropriate temperature for preventing battery deterioration. In this case, the V2G devices V1 to V3 and the electric vehicles may be embedded with corresponding software that enables such control.

The electric power adjusting device 62 may also be configured to be able to set each of the electric vehicles to actively participate in adjusting the electric power demand in the power utility grid 12. Such a setting may be stored in the electric power adjusting device 62. The electric power adjusting device 62 may also be configured to store such a setting into a controller (ECU) or the like of the electric vehicle by the function of corresponding software installed in the electric vehicle. In this case, in the process of classifying the electric vehicles, it is possible to classify a plurality of electric vehicles connected to the power utility grid 12 into a plurality of groups according to whether or not each of the electric vehicles is set to actively participate in adjusting an electric power demand in the power utility grid 12. Thus, the plurality of electric vehicles are classified according to whether or not each of the electric vehicles is set to actively participate in adjusting an electric power demand in the power utility grid 12. The resource aggregator 16 may control the V2G system to allow a group that is set to actively participate in adjusting an electric power demand in the power utility grid 12 to participate in adjusting the electric power demand in the power utility grid 12 at all times, if the state of the on-board battery permits, for example. The resource aggregator 16 may also control the V2G system to allow a group that is not set to actively participate in adjusting the electric power demand in the power utility grid 12 to participate in adjusting the electric power demand when the electric power demand adjustment cannot be fully covered by the group that is set to actively participate in adjusting the electric power demand in the power utility grid 12.

As has been described above, there are several ways of classification for the process of classifying the electric vehicles. These ways of classification may be combined hierarchically. For example, as illustrated in FIG. 1, a plurality of electric vehicles may be classified into the group G1 consisting of BEVs and the groups G2 and G3 excluding BEVs, and each of the groups may be further classified according to the deterioration level of the on-board battery. Each of the groups may further be classified into a plurality of groups based on the spare capacity, of each of the electric vehicles. By combining the ways of classification hierarchically in that way, the electric vehicles can be classified more specifically and more precisely. This allows the resource aggregator 16 to control each of the electric vehicles more appropriately. It should be noted that the ways and procedures of classifying electric vehicles into groups are not limited to the foregoing examples.

The process C of adjusting may be configured so that each of the burdens of electric power demand shared by the groups is different between when the electric power demand requirement in the power utility grid 12 is an upward DR and when it is a downward DR. As a result, the share of electric power demand is adjusted appropriately for each of the groups, so the deterioration of on-board batteries in each of the groups can be easily prevented.

Various embodiments of the invention have been described hereinabove according to the present disclosure. Unless specifically stated otherwise, the embodiments described herein do not limit the scope of the present disclosure. It should be noted that various other modifications and alterations may be possible in the embodiments of the present disclosure. In addition, the features, structures, or steps described herein may be omitted as appropriate, or may be combined in any suitable combinations, unless specifically stated otherwise.

What is claimed is:

1. An electric power adjusting device configured to execute:
    acquiring vehicle information of a plurality of electric vehicles connected to a power utility grid;
    classifying, based on the vehicle information, the plurality of electric vehicles into a plurality of groups according to predetermined characteristics;
    sending a control signal to control charging and discharging of the plurality of electric vehicles connected to the power utility grid; and
    adjusting a charging and discharging burden on the plurality of electric vehicles for each of the plurality of groups when adjusting an electric power demand in the power utility grid, wherein
    each of the plurality of electrical vehicles is configured to, in response to receiving the control signal, adjust the charging and discharging of an on-board battery of a corresponding electrical vehicle of the plurality of electric vehicles,
    the vehicle information includes classification information of the plurality of electric vehicles, and
    the classifying the electric vehicles includes classifying the plurality of electric vehicles into
        a first group consisting of battery electric vehicles (BEVs) and assigned to take care of a first period component, the first period component being a waveform capturing changes in the electric power demand at first intervals,
        a second group excluding BEVs and assigned to take care of a second period component, the second period component being a waveform capturing the changes in the electric power demand at second intervals less than the first intervals, and
        a third group excluding BEVs and assigned to take care of a third period component, the third period component being a waveform capturing the changes in the electric power demand at third intervals less than the second intervals.

2. The electric power adjusting device according to claim 1, comprising:
    a memory storage unit storing the vehicle information of the plurality of electric vehicles.

3. The electric power adjusting device according to claim 2, wherein
    the memory storage unit stores each of the plurality of groups to which each of the plurality of electric vehicles belongs.

4. The electric power adjusting device according to claim 1, wherein:
    the vehicle information includes a charge-discharge capability of an on-board battery mounted in each of the plurality of electric vehicles; and
    the classifying the plurality of electric vehicles includes classifying the plurality of electric vehicles into the plurality of groups based on the charge-discharge capability of the on-board battery.

5. The electric power adjusting device according to claim 1, wherein
    the second group and the third group excluding BEVs include
        an electric vehicle including an internal combustion engine and an on-board battery for driving the electric vehicle and being configured to charge electric power generated by the internal combustion engine into the on-board battery, and
        a fuel cell vehicle including a fuel cell.

6. The electric power adjusting device according to claim 1, wherein
    discharging from the second group and the third group excluding BEVs overrides discharging from the first group consisting of BEVs when an electric power demand requirement in the power utility grid is a downward demand response (DR).

7. The electric power adjusting device according to claim 1, wherein
    charging to the second group and the third group excluding BEVs overrides charging to the first group consisting of BEVs when an electric power demand requirement in the power utility grid is an upward DR.

8. The electric power adjusting device according to claim 1, wherein
    charging to the first group consisting of BEVs overrides charging to the second group and the third group excluding BEVs when an electric power demand requirement in the power utility grid is an upward DR.

9. The electric power adjusting device according to claim 1, wherein:
    the vehicle information includes a maximum charge capacity of an on-board battery mounted in each of the plurality of electric vehicles; and
    the classifying the plurality of electric vehicles includes classifying the plurality of electric vehicles into the plurality of groups based on the maximum charge capacity of the on-board battery.

10. The electric power adjusting device according to claim 1, wherein:
    the electric power adjusting device is configured to set a required amount of charge for each of the plurality of electric vehicles;
    the vehicle information includes a maximum charge capacity of an on-board battery mounted in each of the plurality of electric vehicles; and
    the classifying the plurality of electric vehicles includes classifying the plurality of electric vehicles connected to the power utility grid into the plurality of groups based on a spare capacity obtained by subtracting the required amount of charge from the maximum charge capacity of the on-board battery.

11. The electric power adjusting device according to claim 1, wherein:
the vehicle information includes a deterioration level of an on-board battery mounted in each of the plurality of electric vehicles; and
the classifying the plurality of electric vehicles includes classifying the plurality of electric vehicles connected to the power utility grid into the plurality of groups based on the deterioration level of the on-board battery.

12. The electric power adjusting device according to claim 1, wherein:
the vehicle information includes temperature information of an on-board battery mounted in each of the plurality of electric vehicles; and
the classifying the plurality of electric vehicles includes classifying the plurality of electric vehicles connected to the power utility grid into the plurality of groups based on the temperature information of the on-board battery.

13. The electric power adjusting device according to claim 1, wherein:
the electric power adjusting device is further configured to set each of the plurality of electric vehicles to actively participate in adjusting the electric power demand in the power utility grid; and
the classifying the plurality of electric vehicles includes classifying the plurality of electric vehicles connected to the power utility grid into the plurality of groups according to whether or not an electric vehicle of the plurality of electric vehicles is set to actively participate in adjusting the electric power demand in the power utility grid.

14. The electric power adjusting device according to claim 1, wherein,
in the adjusting, each of the charging burden and discharging burden of the electric power demand shared among the plurality of groups is different when an electric power demand requirement in the power utility grid is an upward DR and when the electric power demand requirement in the power utility grid is a downward DR.

15. The electric power adjusting device according to claim 1, wherein
the first group is configured to, in response to the electric power demand in the power utility grid, charge or discharge at a constant current value, and
the second group and the third group are configured to, in response to (i) the electric power demand in the power utility grid and (ii) the first group not capable of handling the charging or discharging, charge or discharge at a non-constant current value.

16. A system, comprising:
a plurality of electric vehicles; and
an electric power adjusting device configured to execute:
acquiring vehicle information of the plurality of electric vehicles connected to a power utility grid,
classifying, based on the vehicle information, the plurality of electric vehicles into a plurality of groups according to predetermined characteristics,
sending a control signal to control charging and discharging of the plurality of electric vehicles connected to the power utility grid,
adjusting a charging and discharging burden on the plurality of electric vehicles for each of the plurality of groups when adjusting an electric power demand in the power utility grid, wherein
each of the plurality of electrical vehicles is configured to, in response to receiving the control signal, adjust the charging and discharging of an on-board battery of a corresponding electrical vehicle,
the vehicle information includes classification information of the plurality of electric vehicles, and
the classifying the electric vehicles includes classifying the plurality of electric vehicles into
a first group consisting of battery electric vehicles (BEVs) and assigned to take care of a first period component, the first period component being a waveform capturing changes in the electric power demand at first intervals,
a second group excluding BEVs and assigned to take care of a second period component, the second period component being a waveform capturing the changes in the electric power demand at second intervals less than the first intervals, and
a third group excluding BEVs and assigned to take care of a third period component, the third period component being a waveform capturing the changes in the electric power demand at third intervals less than the second intervals.

17. The system according to claim 16, wherein
the first group is configured to, in response to the electric power demand in the power utility grid, charge or discharge at a constant current value, and
the second group and the third group are configured to, in response to (i) the electric power demand in the power utility grid and (ii) the first group not capable of handling the charging or discharging, charge or discharge at a non-constant current value.

* * * * *